United States Patent
Kotlov

(12) 
(10) Patent No.: US 6,625,632 B1
(45) Date of Patent: Sep. 23, 2003

(54) METHOD AND APPARATUS FOR SQUARE ROOT GENERATION USING BIT MANIPULATION AND INSTRUCTION INTERLEAVING

(75) Inventor: Valeri Kotlov, Woburn, MA (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 0 days.

(21) Appl. No.: 09/536,836

(22) Filed: Mar. 27, 2000

Related U.S. Application Data

(60) Provisional application No. 60/192,143, filed on Mar. 24, 2000.

(51) Int. Cl.[7] .................................................. G06F 7/552
(52) U.S. Cl. ...................................................... 708/500
(58) Field of Search ................................. 708/605, 500, 708/502

(56) References Cited

U.S. PATENT DOCUMENTS

| | | | | |
|---|---|---|---|---|
| 5,386,375 A | * | 1/1995 | Smith | 708/500 |
| 6,175,907 B1 | * | 1/2001 | Elliott et al. | 708/500 |
| 6,349,319 B1 | * | 2/2002 | Shankar et al. | 708/500 |

OTHER PUBLICATIONS

Company Manual of Motorola. "AltiVec™ Programming Environments Manual," AltiveCPEM/D, Nov. 1998, Rev. 1, pp 4–17 through 4–18 and 6–132 through 6–133.

* cited by examiner

*Primary Examiner*—Tan V. Mai
(74) *Attorney, Agent, or Firm*—Nutter McClennen & Fish LLP; David J. Powsner; Ronald E. Cahill

(57) ABSTRACT

The invention provides improved methods and systems for generation of square roots of vector and administrative operands. The methods utilize bit-manipulation operations to halve intermediate values, generated by a processor reciprocal square root operation, during a multistep process square root determination. Such methods can also multiply an original operand (whose square root is being determined) with such an intermediate value, e.g., or a halved or other value thereon. The invention also provides methods and apparatus for determination of square roots square roots of large groups of numbers by interleaving vector and administrative instructions to take advantage of necessary delays in the vector processing pipeline architecture to speed overall processing.

57 Claims, 3 Drawing Sheets

| clock cycle | Vector Pipeline 1 | Vector Pipeline 2 | Vector Pipeline 3 | Vector Pipeline 4 | Other Instructions |
|---|---|---|---|---|---|
| clock 1 | load (1) | | | | |
| clock 2 | sqrec (1) | load (2) | load (3) | load (4) | |
| clock 3 | | sqrec (2) | sqrec (3) | sqrec (4) | increment input pointer |
| clock 4 | | | | | |
| clock 5 | | | | | |
| clock 6 | | | | | |
| clock 7 | sqrech (1) | | | | |
| clock 8 | | sqrech (2) | sqrech (3) | sqrech (4) | (begin processing loop) |
| clock 9 | | | | | |
| clock 10 | | | | | |
| clock 11 | sqrth (1)  load (5) | sqrth (2) | sqrth (3) | sqrth (4) | decrement element count |
| clock 12 | | | | | |
| clock 13 | | | | | |
| clock 14 | | | | | |
| clock 15 | sqrte (1) | sqrte (2) | sqrte (3) | sqrte (4) | |
| clock 16 | | load (6) | | | |
| clock 17 | | | load (7) | | |
| clock 18 | | | | load (8) | increment output pointer |
| clock 19 | eps (1) | eps (2) | eps (3) | eps (4) | |
| clock 20 | | | | | |
| clock 21 | | | | | |
| clock 22 | | | | | |
| clock 23 | c (1) | c(2) | c(3) | c(4) | increment input pointer |
| clock 24 | | | | | |
| clock 25 | | | | | |
| clock 26 | store (1) | | | | |
| clock 27 | sqrec (5) | sqrec (6) | store (3) | | |
| clock 28 | | store (2) | sqrec (7) | sqrec (8) | |
| clock 29 | | | | store (4) | |
| clock 30 | | | | | |
| clock 31 | sqrech (5) | | | | |
| clock 32 | | | | | (end processing loop) |
| clock 33 | | | | | complete processing |

*FIG. 2*

METHOD AND APPARATUS FOR SQUARE ROOT GENERATION USING BIT MANIPULATION AND INSTRUCTION INTERLEAVING

This invention claims the benefit of priority of U.S. patent application Ser. No. 60/192,143, filed Mar. 24, 2000, with U.S. Postal Service Express Mail Label No. EI452537590US, and entitled "METHOD AND APPARATUS FOR SQUARE ROOT GENERATION USING BIT MANIPULATION AND INSTRUCTION INTERLEAVING."

BACKGROUND OF THE INVENTION

The invention pertains to digital data processing and, more particularly, to improved methods and apparatus for generating square roots.

Many scientific and engineering computations involve square root calculations. These may be performed, for example, thousands or millions of times during the analysis of radar signals, processing speech or speech signals, processing video signals, or in solving other engineering and scientific problems.

Traditionally, such computationally-intensive applications have been serviced by workstations or other computing devices employing general purpose microprocessors that work in concert with DSPs (digital signal processors), custom ASICs (application specific integrated circuits) or other off-chip devices. The microprocessors perform instruction execution and provide overall control. The off-chip devices perform specialized mathematical computations such as generating square roots. More recently, array or vector processors have been developed that provide instruction execution, control and vector computation functions on a single chip.

In one common type of array processor, the SIMD (single instruction, multiple data) processor, a single instruction operates on a vector register that holds multiple values. This is in contrast to a conventional processor, in which each instruction operates on only a single data value. One class of recent SIMD processors employ the AltiVec™ technology, of Motorola, that is capable of concurrently operating on vectors with 4, 8 or 16 values.

Processors such as the AltiVec™ do not provide for the direct calculation of vector square roots. Instead, they provide only reciprocal square root operations. In order to determine the square roots of multiple values, it is thus necessary to load those values into a vector register, to invoke the AltiVec™ vector reciprocal square root instruction (vrsqrtefp), and to calculate reciprocals of each of the values in the result vector.

Notwithstanding the benefits of array processors such as the AltiVec™, the rapid determination of square roots, e.g., for multiple vectors or large sets of numbers, remains problematic. Where there is a risk that one of the operands may be zero, for example, reciprocal square root operations can produce unpredictable results and, in any event, necessitate that computer programs utilizing those operations execute extra instructions—typically conditional branches—to insure proper processing. These extra instructions can add significantly to overall processing time, especially, in applications requiring generation of thousands or millions of square roots.

In view of the foregoing, an object of the invention is to provide improved methods and apparatus for digital data processing.

A more particular object is to provide such methods and apparatus as permit the rapid generation of square roots.

Another object is to provide such methods as permit the generation of square roots of multiple vectors or other large sets of operands.

Yet another object is to such methods and apparatus as can be utilized with exisiting and future processors, including vector processors.

SUMMARY OF THE INVENTION

These and other objects are attained by the invention that provides, in some aspects, novel methods utilizing inter alia processor bit-manipulation operations, as well as floating-point or other arithmetic operations, to generate square roots of vector and non-vector operands. The methods have application, by way of particular example, with processor instruction sets that provide for reciprocal square root operations.

A method according to the foregoing aspects of the invention utilizes a bit-manipulation operation to halve an intermediate value, generated by a processor reciprocal square root operation, during a multistep process for determining square roots. Such a method can also multiply an original operand (whose square root is being determined) with such an intermediate value, e.g., or a halved or other value thereon. Use of such bit-manipulation and multiplication operations avoids risks that might otherwise be associated with performing a floating point or other arithmetic operations on the resultant value of a reciprocal square root operation whose original operand was zero. It likewise avoids the need to perform additional steps, e.g., conditional branching, to obviate such risks.

Still further related aspects of the invention provide methods for determination of a square root utilizing a sequence of steps that include one or more of the following instructions: (1) invoking a processor reciprocal square root operation on an operand x; (2) halving the resultant value generated by that processor operation, preferably, via a bit-manipulation operation on the value's mantissa; (3) multiplying the halved value by the original operand, x; (4) estimating the square root of x by doubling the value generated in the prior step; (5) estimating an error value by substracting the multiplied results of the two prior steps from one-half; and (6) re-estimating the square root, with still greater precision, by multiplying the prior estimate by a value equal to one plus the estimated error value.

Methods according to the foregoing aspects are advantageous over the prior art.

Among other reasons, such methods permit the rapid generation of square roots without requiring branching, testing or other instructions that might otherwise consume needless processor resources. The methods provide such benefits while, at the same time, reducing the error otherwise associated with the processor instruction set.

Other aspects of the invention provide novel methods of simultaneously generating square roots of large groups of numbers using a vector processor. Methods according to these aspects interleave vector instructions for processing several vectors, taking advantage of necessary delays in the vector processing pipeline architecture to speed up overall processing.

In one such aspect of the invention, multiple sequences of the type described above are interleaved in an "inner loop" of a process for generating vector square roots, thus, enabling the determination of tens, hundreds, or thousands of such values in the minimal time and with the minimal computational resources.

In another such aspect, non-vector instructions such as loading data from memory to vector registers and storing data from vector registers to memory are scheduled to occur during the inherent latency period required for execution of vector instructions, thus, eliminating any additional time to attend to "administration" of the inner loop.

These and other aspects of the invention have the advantage of permitting rapid square root determinations without excessive use of system resources.

BRIEF DESCRIPTION OF THE DRAWINGS

The invention will be more fully understood from the following detailed description taken in conjunction with the accompanying drawings, in which:

FIG. 2 is a chart showing sequences of interleaved instructions exercised by an automated digital data processor operating in accord with the invention to determine square roots for a large number of vectors.

DETAILED DESCRIPTION OF THE DRAWINGS

Figure 1:
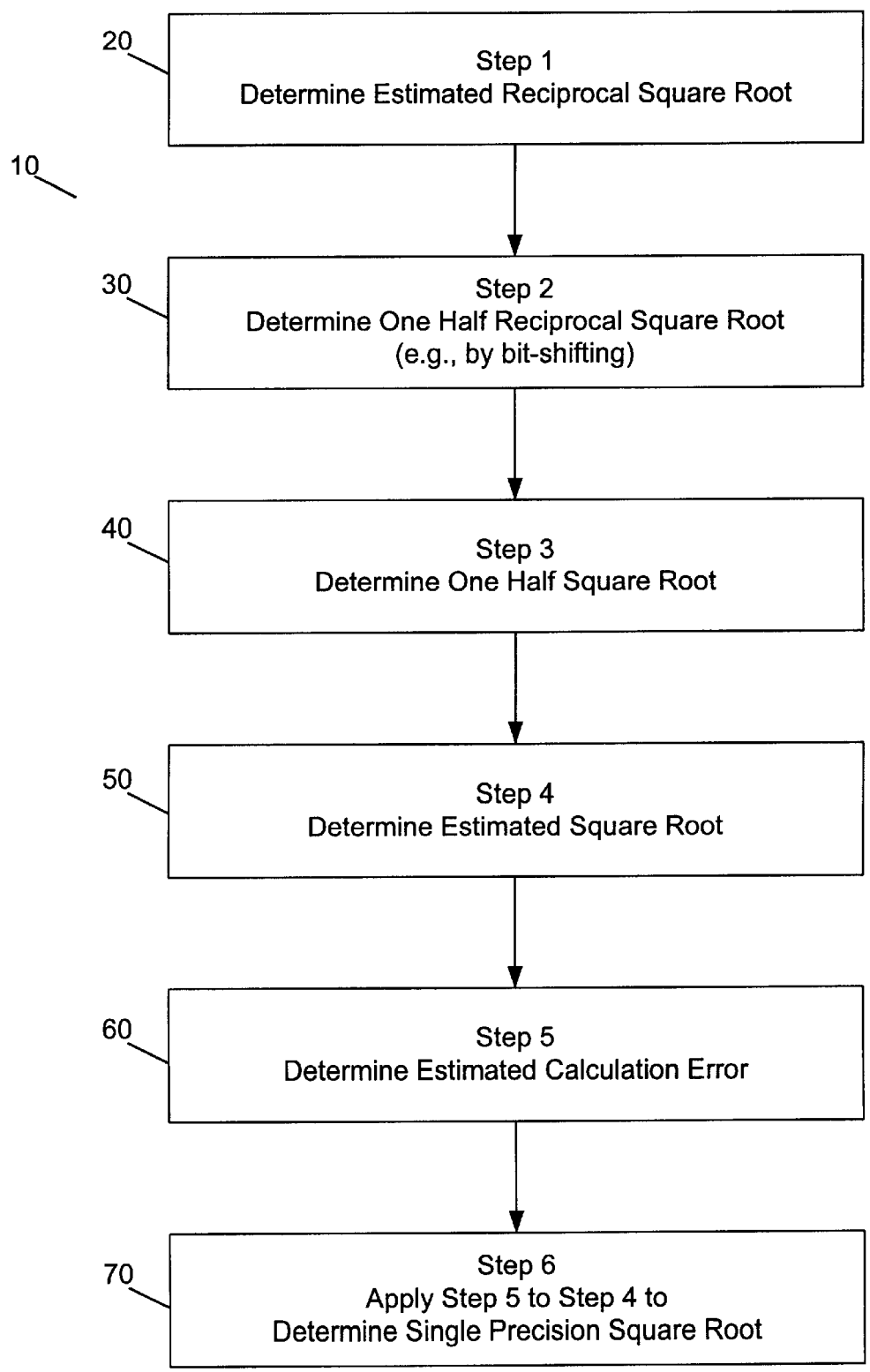
FIG. 1 is a flow chart showing a series of steps performed in one embodiment of the invention for rapidly determining a square root of an operand x, e.g., on an automated digital data processor.

A method 10 according to the invention for generating square roots, e.g., utilizing bit interleaving, is illustrated in FIG. 1. This method can be advantageously practiced on a digital data processing system having vector processing capabilities, such as the PowerPC AltiVec processor. The embodiment hereof is accordingly described with reference to AltiVec functionality. It will be appreciated that such methods can be carried out using any other suitable processor or processor architecture, as will be apparent to the person of ordinary skill in the art in view of the discussion that follows.

In step one (element 20), a method according to the invention for generating the square root of an operand "x," estimates the reciprocal square root of x by invoking a suitable reciprocal square root processor instruction, e.g., $$sqrec=\text{VRSQRTEFP}(x)$$

where VRSQRTEFP refers to the Vector Reciprocal Square Root Estimate Floating Point operation, and in particular, is the pneumonic for this operation in the AltiVec instruction set.

Mathematically, this step results in assigning a value to the variable sqrec as follows:

$$sqrec=(1/sqrt(x))*(1+\epsilon);$$

where $(1+\epsilon)$ represents the built-in error of the processor; and $|\epsilon|<2^{-12}$ as defined in the AltiVec instruction set for this operation and as is common in other processor instruction sets.

The first step in generating the square root of x is thus to generate an estimate of the reciprocal square root. Some processors, including AltiVec processors, return a false "infinity" value, where x is zero. Other processors do not return a predictable value at all. While either of these results can be advantageous in that the program does not crash as a result of this singular value, it can lead to incorrect results, if not properly taken into account. The steps below address this situation, without adding additional time consuming steps.

The second step 30 of the illustrated method as shown in FIG. 1 is to determine a value for one-half the estimated square-root-reciprocal, i.e., a value "sqrech" as follows:

$$sqrech=sqrec/2;$$

or substituting for the variables:

$$sqrech=0.5*(1/sqrt(x))*(1+\epsilon).$$

In a processor, such as the AltiVec processor, which uses IEEE floating point numbers and which allows bit manipulation of the floating point number, this operation is preferably performed by subtracting one from the exponent portion of the floating point value of sqrec. Because the exponent is a binary exponent, subtracting one from the exponent divides the floating point number by two. This bit manipulation obviates uncertainties that might otherwise flow from "infinity" or other unpredictable values returned by VRSQRTEFP where x is zero.

Illustrated step three 40 determines an estimated value for one-half the square root, by multiplying the results of step two by the operand itself:

$$sqrth=sqrech*x;$$

or substituting for the variables:

$$sqrth=0.5*sqrt(x)*(1+\epsilon).$$

By utilizing the operand x in this manner, the method advantageously avoids—without the need for comparison or branch operations—any error that might otherwise result from use of false infinity or other unpredictable values returned by the reciprocal square root instruction (e.g., VRSQRTEFP) where x is zero.

In step four 50, the illustrated method estimates the square root from the result of step three, e.g., as follows:

$$sqrte=sqrth*2;$$

or substituting for the variables and simplifying:

$$sqrte=sqrt(x)*(1+\epsilon).$$

The estimate is preferably achieved using a multiplication step, or if desired, by adding sqrth to itself.

In step five 60, the illustrated method estimates the error introduced, e.g., by the processor, in performing the original VRSQRTEFP operation. In this step, the additive inverse ne is determined, where ne=$-\epsilon$. The determination proceeds as follows:

$$ne\approx 0.5-sqrte*sqrech$$

or substituting for the variables:

$$ne=0.5-sqrt(x)*(1+\epsilon)*(0.5/sqrt(x))*(1+\epsilon)$$

$$ne=0.5-0.5*(1+\epsilon)^2=0.5-0.5*(1+2\epsilon+\epsilon^2)$$

$ne=-\epsilon 0.5*\epsilon^2$; because $0.5*\epsilon^2$ is very small compared to $\epsilon$;

$$ne\approx-\epsilon.$$

In step six 70, the illustrated method determines a more precise square root value ("c") by reducing the error attributable to the VRSQRTEFP operation as follows:

$$c = sqrte^*(1+ne);$$

or substituting for the variables:

$$c = sqrt(x)^*(1+\epsilon)^*(1-\epsilon);\text{ and simplifying:}$$

$$c = sqrt(x)^*(1-\epsilon^2)$$

Because we know that $|\epsilon| \leq 2^{-12}$, it must be true that $\epsilon^2 \leq 2^{-24}$, and a 24-bit precision estimate has been achieved.

The method of FIG. 1 is advantageous in that it determines a square root having full IEEE floating point single precision with only six instructions, using the highly efficient VRSQRTEFP operation, without any comparisons or conditional branching operations and without errors that might otherwise result when x is zero.

While the method has been illustrated using the AltiVec vector instructions, which operate on four floating point numbers at a time, the method can similarly be applied on a non-vector processor to generate square roots one at a time (e.g., so long as that non-vector processor has a reciprocal square root function and, for example, the capability to perform bit-manipulation on floating point operands).

A further embodiment of the invention is illustrated in FIG. 2, where multiple sequences of the type described in connection witih FIG. 1 are interleaved in order to generate square roots of values contained in a plurality of vectors. In addition to the benefits discussed above, such interleaving permits "administrative" operations—such as loads and stores—to be scheduled and performed without adding additional processor cycles.

In method 80, four vector processing pipelines 90, 100, 110, 120 are illustrated for concurrently determining the square root of each of four values contained in each of the four vectors (for a total of 16 square root calculations) being processed in parallel. The method 80 includes an introductory loading portion 130 and a processing loop 140 that may be repeated any number of times (within available cache memory constraints) to process as many groups of four vectors as is required. Processing completion portion 150 finishes the calculation of the last group of four vectors that has been loaded and processed in loop 140, as will be obvious to the person of ordinary skill in the art based on the operation of the processing loop as described herein.

In introductory loading portion 130 of the illustrated method, each vector pipeline is loaded with a vector (the initial four vectors are numbered (1) through (4)). During the processing loop 140, each vector pipeline is loaded with an additional vector while the first vector in each respective pipeline is being operated on by the vector processor. These additional vectors are numbered (5) through (8) in vector pipelines 1 through 4 respectively. If the processing loop continues to iterate, additional groups of four vectors will be loaded and processed.

In each pipeline, a vector is first loaded from memory into an initial vector register, then processed with six vector instructions representing the six steps of the method 10 of FIG. 1, then stored in memory. The vector instructions are referred to in FIG. 2 according to the name of the variable that is assigned a value in step described in FIG. 1, and are labeled according to the vector being processed.

In the first pass through processing loop 140, processing of each of the four loaded vectors (numbered 1 through 4) is completed and the results are stored in memory by the end of the loop. In addition, the second four vectors (numbered 5 through 8) are loaded into the four vector pipelines and processing begins on these vectors following the last calculation of the previous vector in the pipeline. For example, in vector pipeline 1, c(1), the final vector calculation for vector (1) is completed before the sqrec(5) vector instruction, the first vector instruction on the second vector to be loaded into vector pipeline 1 (and denoted vector(5)), is performed.

If the processing loop 140 is run a second time, the second vector (vector (5)) is processed as the first vector (vector (1)) had been in the first time through the loop. For example, loaded vector (5) has sqrec(5) and sqrech(5) calculations performed in time slots 27 and 31, respectively, in the first pass through the loop. When the loop branches back to its start, the sqrth(5) calculation is performed in time slot 11 where sqrth(1) had been performed in the previous loop, and a new vector (vector (9), not shown) will be loaded for processing. This processing occurs in each vector pipeline in the manner illustrated in FIG. 2.

Importantly, "administrative" instructions, i.e., those necessary to set up and administer the loop, such as, vector load, vector store, input/output, pointer arithmetic and other non-vector arithmetic instructions, can be scheduled to occur during the latency period of vector arithmetic instructions. Because the vector instructions can take several clock cycles (or more) to execute, a non-vector instruction queued after a vector instruction can be processed in parallel with the ongoing vector calculation so that the instructions are effectively parallel and the non-vector instructions add no time to the processing loop 140. For example, each of the four loading steps in the processing loop (labeled load(5), load (6), load(7) and load(8)) follows immediately from each of the four vector calculation instruction steps in vector pipeline 1 (labeled sqrth(1), sqrte(1), eps(1) and c(1)). Because of this queuing, the loading steps occur substantially concurrently with the vector processing steps that they follow. For this reason, the steps are shown in FIG. 2 as occurring in the same time slot. For example, sqrte(1) in vector pipeline 1 and load(6) both occur in time slot 15 because the load(6) instruction is queued to follow the sqrte(1) instruction, and operates concurrently with it. The "store" and "other instructions" 150 are similarly scheduled.

Figure 3:
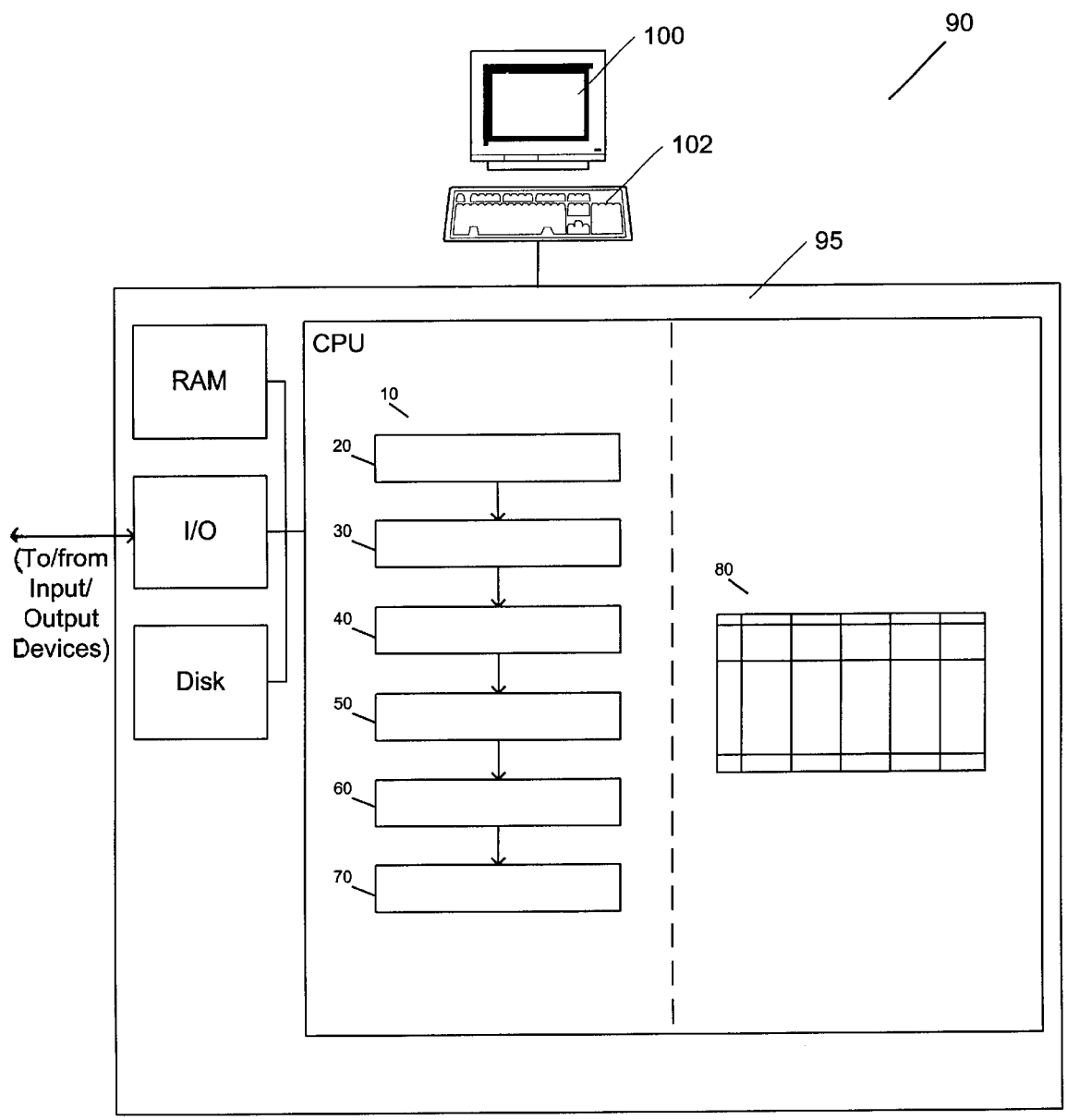
FIG. 3 depicts a digital data processing apparatus operating in accord with the methods of FIGS. 1 and 2.

FIG. 3 illustrates an apparatus 90 for generating square roots in accord with the methodologies shown in FIGS. 1–2 and discussed above. The apparatus 90 comprises a mainframe computer, workstation, personal computer, daughter board, co-processing module, microprocessor or other general or special-purpose digital data processor programmed in accord with the teachings hereof.

In the illustrated embodiment, apparatus 90 comprises a general purpose computer 95 of the type that includes a central processing unit labeled "CPU" (e.g., of the type having a vector processing instructions or otherwise suitable for execution of methods according to the invention), a memory unit labeled "RAM", and input/output unit labeled "I/O", all of which are constructed, interconnected and operated in the conventional manner, as programmed in accord with the teachings hereof. The device 95 is connected to a monitor 100 or other output device, such as a printer (not shown), as well as to input devices, such as keyboard 102 and mouse (not shown), e.g., by which a user can monitor, control operation of, and otherwise interact with device 95.

Digital data processor 95 can be connected, e.g., via the I/O unit or otherwise, to accept signals or values (e.g., radar signals, video signals, or otherwise) for which square roots are to be determined. Alternatively, or in addition, such values can be stored or pre-stored on the disk or other storage device. Square root values generated by digital data processor 95 can be output, e.g., by the I/O unit, stored to disk or otherwise.

Digital data processor 95 is programmed in a conventional manner to operate in accord with the methodologies shown in FIG. 1–2 and discussed above to generate square roots. As more particularly indicated by the flow-chart outline within the illustrated CPU, that element is configured by such programming to execute steps 10–80, discussed above, and thereby to serve as means for providing that functionality.

One skilled in the art will appreciate further features and advantages of the invention based on the above-described embodiments. Thus, by way of non-limiting example, whereas FIG. 2 is discussed in connection with the processing of vectors containing four values, the illustrated method can be extended to process vectors of other sizes. Moreover, by way of further example, it will be appreciated that the methodologies described herein can be executed on a range of digital data processors and digital data processing environments, in addition to that shown in FIG. 3. Accordingly, the invention is not to be limited by what has been particularly shown and described, except as indicated by the appended claims. All publications and references cited herein are expressly incorporated herein by reference in their entirety.

What is claimed is:

1. A method for rapidly calculating a square root of a number using a computer processor having floating point arithmetic functionality and having an instruction set that includes an estimated reciprocal square root operation, the estimated reciprocal square root operation producing a calculation error, comprising the steps of:
   calling the reciprocal square root operation of the processor with a number to calculate an estimated reciprocal square root of the number;
   calculating a one half reciprocal square root from the estimated reciprocal square root;
   calculating a one half square root from the one half reciprocal square root;
   calculating an estimated square root of the number from the one half of the square root;
   calculating an estimated calculation error using the estimated square root and the one half reciprocal square root; and
   applying the estimated calculation error to the estimated square root to double the precision of the estimated square root.

2. The method of claim 1, wherein the estimated reciprocal square root represents a floating point format and the one half reciprocal square root is calculated subtracting one from the exponent of the estimated reciprocal square root.

3. The method of claim 1, wherein the one half square root is calculated from the one half reciprocal square root by multiplying the one half reciprocal square root by the number.

4. The method of claim 1, wherein the estimated calculation error is calculated as 0.5–(the estimated square root*the one half reciprocal square root).

5. The method of claim 1, wherein the precision of the estimated square root is doubled by multiplying the estimated square root by (1–the estimated calculation error).

6. The method of claim 1, wherein the method is performed without any comparison and conditional branching.

7. The method of claim 1, wherein the processor is a vector processor and a plurality of square roots are concurrently calculated on a plurality of numbers presented to the processor as a single vector.

8. The method of claim 7, wherein a plurality of vectors pipelines process a plurality of vectors concurrently.

9. The method of claim 8, wherein vector instructions are interleaved among the plurality of vector pipelines.

10. The method of claim 9, wherein administrative instructions are queued with the vector instructions so as to process concurrently with the vector instructions and add no time to the calculation of a plurality of square roots.

11. The method of claim 10, wherein the administrative instructions include loading vectors from memory into vector registers, and storing vectors from vector registers into memory.

12. The method of claim 1, wherein the estimated reciprocal square root operation returns a value having 12-bit accuracy, and applying the estimated calculation error to the estimated square root results in a square root calculated to 24-bit accuracy.

13. An apparatus for rapidly calculating a square root of a number comprising:
   a processor having floating point arithmetic;
   means for calculating a reciprocal square root of the number having a calculation error;
   means for calculating a one half reciprocal square root from the estimated reciprocal square root;
   means for calculating a one half square root from the one half reciprocal square root;
   means for calculating an estimated square root of the number from the one half of the square root;
   means for calculating an estimated calculation error using the estimated square root and the one half reciprocal square root; and
   means for applying the estimated calculation error to the estimated square root to double the precision of the estimated square root.

14. The apparatus of claim 13, wherein the estimated reciprocal square root represents a floating point form and the functionality that calculates the one half reciprocal square root subtracts one from the exponent of the estimated reciprocal square root.

15. The apparatus of claim 13, wherein the means for calculating a one half square root multiplies the one half reciprocal square root by the number.

16. The apparatus of claim 13, wherein the means for calculating the estimated calculation error applies the formula:

0.5–(the estimated square root*the one half reciprocal square root).

17. The apparatus of claim 13, wherein means for applying the estimated calculation error to the estimated square root to double the precision of the square root multiplies the estimated square root by (1–the estimated calculation error).

18. The apparatus of claim 13, wherein the processor means is a vector processor and includes a functionality that concurrently calculates a plurality of square roots from a plurality of numbers presented to the processor as a single vector.

19. The apparatus of claim 18, wherein the processor means includes a plurality of vectors pipelines processing a plurality of vectors concurrently.

20. The apparatus of claim 19, wherein vector instructions are interleaved among the plurality of vector pipelines.

21. The apparatus of claim 20, wherein administrative instructions are queued with the vector instructions so as to process concurrently with the vector instructions and add no time to the calculation of a plurality of square roots.

22. The apparatus of claim 21, wherein the administrative instructions include loading vectors from memory into vector registers, and storing vectors from vector registers into memory.

23. A computer program product for rapidly calculating a square root of a number using a computer processor having floating point arithmetic functionality and having an instruction set that includes an estimated reciprocal square root operation, the estimated reciprocal square root operation producing a calculation error, comprising computer useable medium having computer readable code to:

call the reciprocal square root operation of the processor with a number to calculate an estimated reciprocal square root of the number;

calculate a one half reciprocal square root from the estimated reciprocal square root;

calculate a one half square root from the one half reciprocal square root;

calculate an estimated square root of the number from the one half of the square root;

calculate an estimated calculation error using the estimated square root and the one half reciprocal square root; and apply the estimated calculation error to the estimated square root to double the precision of the estimated square root.

24. The computer program product of claim 23, wherein the estimated reciprocal square root is representing in a floating point format and the one half reciprocal square root is calculated subtracting one from the exponent of the estimated reciprocal square root.

25. The computer program product of claim 23, wherein the one half square root is calculated from the one half reciprocal square root by multiplying the one half reciprocal square root by the number.

26. The computer program product of claim 23, wherein the estimated calculation error is calculated as 0.5−(the estimated square root*the one half reciprocal square root).

27. The computer program product of claim 23, wherein the precision of the estimated square root is doubled by multiplying the estimated square root by (1−the estimated calculation error).

28. The computer program product of claim 23, wherein the computer program product includes no conditional branching.

29. The computer program product of claim 23, wherein the processor is a vector processor and a plurality of square roots are concurrently calculated on a plurality of numbers presented to the processor as a single vector.

30. The computer program product of claim 29, wherein a plurality of vectors pipelines process a plurality of vectors concurrently.

31. The computer program product of claim 30, wherein vector instructions are interleaved among the plurality of vector pipelines.

32. The computer program product of claim 31, wherein administrative instructions are queued with the vector instructions so as to process concurrently with the vector instructions and add no time to the calculation of a plurality of square roots.

33. The computer program product of claim 32, wherein the administrative instructions include loading vectors from memory into vector registers, and storing vectors from vector registers into memory.

34. The computer program product of claim 33, wherein the estimated reciprocal square root operation returns a value having 12-bit accuracy, and applying the estimated calculation error to the estimated square root results in a square root calculated to 24-bit accuracy.

35. A digital signal processing apparatus for rapidly calculating a square root for a large group of numbers comprising:

a vector processor having floating point arithmetic functionality for concurrently calculating a plurality of square roots from a plurality of numbers presented to the processor as a single vector and including a plurality of vector pipeline functionality that processes a plurality of vectors concurrently and wherein vector instructions are interleaved among the plurality of vector pipelines and wherein administrative instructions are queued with the vector instructions so as to process concurrently with the vector instructions and add no time to the calculation of a plurality of square roots;

means having a calculation error for calculating a plurality of reciprocal square roots of the plurality of numbers in a vector;

means for calculating a plurality of one half reciprocal square roots from the plurality of estimated reciprocal square roots;

for calculating a plurality of one half square roots from the plurality of one half reciprocal square roots;

means for calculating a plurality of estimated square roots of the numbers from the plurality of one half square roots;

means for calculating a plurality of estimated calculation errors using the plurality of estimated square roots and the plurality of one half reciprocal square roots; and means for applying the plurality of estimated calculation errors to the plurality of estimated square roots to double the precision of the estimated square roots.

36. The apparatus of claim 35, wherein the estimated reciprocal square root is representing in a floating point format and the means for calculating one half reciprocal square roots subtracts one from the exponent of the estimated reciprocal square root.

37. The apparatus of claim 35, wherein the means for calculating one half square roots multiplies the one half reciprocal square root by the number.

38. The apparatus of claim 35, wherein the means for calculating the estimated calculation errors applies the formula:

0.5−(the estimated square root*the one half reciprocal square root).

39. The apparatus of claim 35, wherein the means for applying the plurality of estimated calculation errors to the plurality of estimated square roots to double the precision of the square roots multiplies the estimated square root by (1−the estimated calculation error).

40. A method for rapidly calculating a square root of a number using a computer processor having floating point arithmetic functionality and having an instruction set that includes an estimated reciprocal square root operation, the estimated reciprocal square root operation producing a calculation error, comprising the steps of:

calling the reciprocal square root operation of the processor with a number to calculate an estimated reciprocal square root of the number;

calculating a one half reciprocal square root from the estimated reciprocal square root wherein the estimated reciprocal square root is representing in a floating point format and the one half reciprocal square root is calculated subtracting one from the exponent of the estimated reciprocal square root;

calculating a one half square root from the one half reciprocal square root by multiplying the one half reciprocal square root by the number;

calculating an estimated square root of the number from the one half of the square root;

calculating an estimated calculation error wherein the estimated calculation error is calculated as 0.5−(the estimated square root*the one half reciprocal square root); and applying the estimated calculation error to the estimated square root to double the precision of the estimated square root by multiplying the estimated square root by (1−the estimated calculation error).

41. The method of claim 40, wherein the method is performed without any of comparison or conditional branching.

42. The method of claim 40, wherein the processor is a vector processor and a plurality of square roots are concurrently calculated on a plurality of numbers presented to the processor as a single vector.

43. The method of claim 42, wherein a plurality of vectors pipelines process a plurality of vectors concurrently.

44. The method of claim 43, wherein vector instructions are interleaved among the plurality of vector pipelines.

45. The method of claim 44, wherein administrative instructions are queued with the vector instructions so as to process concurrently with the vector instructions and add no time to the calculation of a plurality of square roots.

46. The method of claim 45, wherein the administrative instructions include loading vectors from memory into vector registers, and storing vectors from vector registers into memory.

47. The method of claim 40, wherein the estimated reciprocal square root operation returns a value having a first degree accuracy, and applying the estimated calculation error to the estimated square root results in a square root calculated to a second degree accuracy, the second degree of accuracy representing a substantial doubling of a number of bits in the first degree of accuracy.

48. In a multistep method for calculating a square root of an operand in a computer processor having floating point processing functionality, the multistep method requiring a one half reciprocal square root value, a method comprising the steps of:

performing a reciprocal square root operation on the operand to return a reciprocal square root value;

performing a bit manipulation on the reciprocal square root value to halve the reciprocal square root value; and processing the halved reciprocal square root value to result in a square root value for the operand.

49. The method of claim 48, further comprising the step of:

multiplying the halved reciprocal square root value by the operand to result in a halved square root value.

50. The method of claim 49, further comprising the step of:

doubling the halved reciprocal square root value to result in an estimated square root value; and applying an estimated error to the estimated square root value to double its precision.

51. The method of claim 50, wherein the estimated error is calculated as one half minus the estimated square root value multiplied by the halved reciprocal square root value.

52. The method of claim 51, wherein the estimated error is applied to the estimated square root value to double its precision by multiplying the estimated square root value by (1−the estimated error).

53. In a multistep method for calculating a square root of an operand in a computer processor having floating point processing functionality, the multistep method requiring a one half reciprocal square root value, a method comprising the steps of:

performing a reciprocal square root operation on the operand to return a reciprocal square root value;

halving the reciprocal square root value;

multiplying the halved reciprocal square root value by the operand to result in a halved square root value; and processing the halved square root value to result in a square root value for the operand.

54. The method of claim 53, wherein the reciprocal square root is halved by performing a bit manipulation on an exponent portion of a floating point representation of the reciprocal square root value.

55. The method of claim 53, further comprising the step of:

doubling the halved reciprocal square root value to result in an estimated square root value; and applying an estimated error to the estimated square root value to double its precision.

56. The method of claim 55, wherein the estimated error is calculated as one half minus the estimated square root value multiplied by the halved reciprocal square root value.

57. The method of claim 56, wherein the estimated error is applied to the estimated square root value to double its precision by multiplying the estimated square root value by (1−the estimated error).

* * * * *

UNITED STATES PATENT AND TRADEMARK OFFICE
CERTIFICATE OF CORRECTION

PATENT NO. : 6,625,632 B1
DATED : September 23, 2003
INVENTOR(S) : Valeri Kotlov It is certified that error appears in the above-identified patent and that said Letters Patent is hereby corrected as shown below:

<u>Column 4,</u>
Line 65, following "ne=-e"; please insert the symbol -- - --

Signed and Sealed this

Thirtieth Day of March, 2004

JON W. DUDAS
*Acting Director of the United States Patent and Trademark Office*